United States Patent
van de Beld et al.

(10) Patent No.: US 7,262,331 B2
(45) Date of Patent: Aug. 28, 2007

(54) PROCESS FOR THE PRODUCTION OF LIQUID FUELS FROM BIOMASS

(75) Inventors: Lambertus van de Beld, Balkbrug (NL); Ferry Ronald Boerefijn, The Hague (NL); Gijsbert Maurits Bos, Apeldoorn (NL); Frans Goudriaan, Castricum (NL); Jaap Erik Naber, Heemskerk (NL); Jan Anton Zeevalkink, Didam (NL)

(73) Assignee: Biofuel B.V., Heemskerk (NL)

( * ) Notice: Subject to any disclaimer, the term of this patent is extended or adjusted under 35 U.S.C. 154(b) by 464 days.

(21) Appl. No.: 10/363,337

(22) PCT Filed: Sep. 3, 2001

(86) PCT No.: PCT/NL01/00648

§ 371 (c)(1),
(2), (4) Date: Aug. 13, 2003

(87) PCT Pub. No.: WO02/20699

PCT Pub. Date: Mar. 14, 2002

(65) Prior Publication Data

US 2004/0034262 A1 Feb. 19, 2004

(30) Foreign Application Priority Data

Sep. 4, 2000 (EP) .................... 00203061

(51) Int. Cl.
*C07C 1/00* (2006.01)
*C10G 1/00* (2006.01)

(52) U.S. Cl. ..................................... 585/240; 585/242
(58) Field of Classification Search .................. 127/36; 585/240, 241, 242
See application file for complete search history.

(56) References Cited

U.S. PATENT DOCUMENTS 4,556,430 A * 12/1985 Converse et al. ............. 127/36
5,400,726 A * 3/1995 Dumons ..................... 110/346

FOREIGN PATENT DOCUMENTS

DE 3106944 A1 * 9/1982
EP 0 204 354 A 12/1986

* cited by examiner

*Primary Examiner*—Glenn Caldarola
*Assistant Examiner*—Prem C. Singh
(74) *Attorney, Agent, or Firm*—Weingarten, Schurgin, Gagnebin & Lebovici LLP

(57) ABSTRACT

A process for continuously producing a pulp biomass, comprising subjecting a biomass containing feed to a treatment which comprises bringing the feed to a pressure of 100-250 bar, keeping the pressurized feed subsequently or concomitantly at a temperature not exceeding 280 degrees C. over a period of up to 60 minutes, thereby obtaining a pulp and optionally subjecting the pulp to a reaction step in which the pulp is heated over a. period of up to 60 minutes to a temperature exceeding 280 degrees C. resulting in the continuous production of a hydrocarbon product having a greater energy density than biomass.

23 Claims, 1 Drawing Sheet

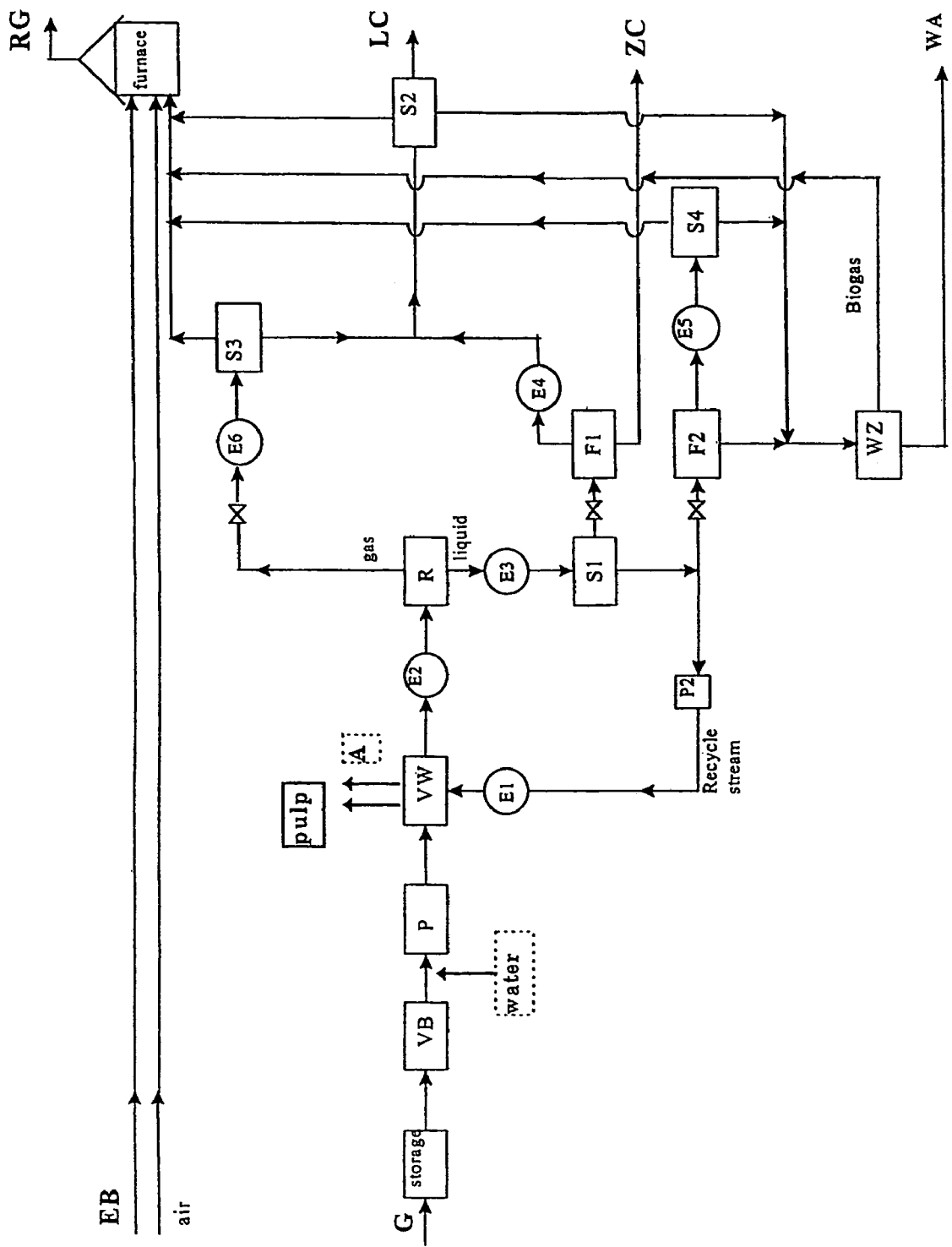

PROCESS FOR THE PRODUCTION OF LIQUID FUELS FROM BIOMASS

The present invention is directed to a process for continuously producing from biomass a hydrocarbon containing product having an enhanced energy density.

There exists a wide-spread interest for the production of energy. from other resources than fossil fuels. Stimulated by both environmental arguments to reduce pollution by conventional use of fossil fuels as well as by reasons of economy to find means for providing energy when oil or gas resources are depleted or economically unattractive, significant efforts have been directed into methods for providing energy from so-called low-energy resources or low-grade fuels such as industrial, municipal and agricultural waste and/or residues. When energy can be produced from low energy sources, these processes are not only interesting for environmental reasons, they are also interesting for providing cheaper means of producing energy in areas which lack conventional fossil fuel resources or the means for reliable transport over larger distances. Such areas can be more remote or lesser developed areas and the transport of conventional fossil fuels would prove costly or inefficient.

WO 95/14850 and WO 96/41070 describe processes in which energy is recovered from carbonaceous waste by comminuting the waste into small particles, providing a slurry of the particles in water with a solid content of about 5 wt. %, and pressurising the slurry to convert most of the chemically bound oxygen to $CO_2$ resulting in most of the carbon being charred. Separation of the charred particles and reslurrying the particles resulted in a slurry with a concentration containing about 55 wt % of the charred particles. Reacting the slurry containing the charred particles with air results in the conversion of the particles into thermal energy, applicable for a number of purposes.

EP-A 0 204 354 describes a process for the production of hydrocarbon containing liquids from biomass. In this publication the biomass is preferably in a particulate form with a size that allows the particles to pass through a 5 mm sieve. The particulate biomass is slurried in water at a ratio of water to biomass of 1:1 to 20:1. The slurry is introduced in a reaction chamber and heated at a temperature of 300-370° C. for a period of more than 30 seconds under an increased pressure ranging from $90 \times 10^5$ to $300 \times 10^5$ Pa. After separating and isolating steps a hydrocarbon containing liquid product ('crude') is obtained with a remaining oxygen content of less than 20 wt. %.

In view of the ongoing interest in further developing more environmental friendly methods for the generation of energy and for more efficient use of natural resources there is a need for improving the presently known methods of energy generation.

One of the drawbacks from the known method such as disclosed in EP-A 0 204 354 is that the reliability of these processes has proven to be variable. If these methods of generating energy from low energy fuels are to be implemented on a large scale or in lesser developed areas, reliability of these processes becomes a key issue for economic feasibility.

It was thus found necessary to provide for more reliable operating conditions and allow for a more economical operation of the process from the type as is described in EP-A 0 204 354. Further there exists a need for a relative low water to biomass ratio in order to provide for an efficient and increased thermal economy of the process.

Accordingly, it is one of the objects of the present invention to provide for improvements in the described technology and otherwise to overcome drawbacks present in the art.

It is a further object of the present invention to provide for a product from biomass with an enhanced energy density that can be used, preferably directly, in the generation of energy or that can be further processed to hydrocarbon containing products, preferably in a liquid form. It is also a goal of the present invention to provide for a process, preferably a continuous process, for the generation of hydrocarbon containing products, preferably liquid, with an enhanced energy density or content. Another goal of the present invention is to provide for a process in which feeds can be processed with a lower water to biomass ratio. Further it is an object of the invention to increase the overall thermal efficiency of the conversion of biomass to products with an increased energy density such as hydrocarbon products and to allow for more variation in the biomass feed.

It has now been found that by a specific sequence of steps and specific process conditions, biomass can be converted into a pulp that has an increased energy density. This pulp is used, for instance as an intermediary product in the generation of energy or converted into a liquid hydrocarbon product. It has also been found that by a specific sequence of steps and/or process conditions the continuous production of liquid hydrocarbon products with an increased yield and/or an increase in overall (thermal) efficiency of the process from biomass is effected in an improved manner. It is to be noted that the processes according to the present invention allow for further optimisation without departing from the inventive concept of the present invention.

The invention accordingly relates to a process for continuously producing a pulp from biomass, comprising a first step in which a biomass containing aqueous feed is subjected to a treatment which comprises bringing the feed to a pressure of 100-250 bar, a second step in which the pressurised feed is kept at a temperature not exceeding 280° C. over a period of up to 60 minutes, thereby forming a pulp and wherein the first step and the second step are carried out subsequently or concomitantly.

The process according to the invention provides for the formation of a pulp from biomass. During the pressurising step and/or the step wherein the feed is heated to form a pulp it is found, without being bound thereto, that the structure of the biomass is weakened. The larger molecules present in the feed are reduced in size and/or the amount of cross-linking is reduced. More precisely, it is believed that the macromolecular and/or polymeric structures present in the feed such as cellulosic polymers, fibrous polymers and the like are significantly degraded or at least reduced in size. The fibrous structure is softened and the resulting mixture is substantially liquid and easily transportable. The more soluble components will dissolve and can be advantageously used in other parts of the process.

The first treatment that comprises bringing the feed to an increased pressure, does not necessitate, prior to the first treatment, the separate preparing of a slurry from the biomass.

In the context of this application, the term slurry is defined as a fluid material comprising a continuous liquid phase wherein a particulate solid phase is dispersed. Solid particles in a slurry tend to sedimentate unless special measures are taken to stabilise the slurry.

By the process of the present invention, the feed is directly brought to process pressure and subsequently or concomitantly heated. This step obviates the use of separate slurrying procedures previously known in the art, which procedures have to be adjusted to the type of biomass. This allows for the use of a wider variety of sources of biomass. For example, a biomass which contains solids, but essentially no continuous liquid phase (e.g. a biomass wherein the liquid phase is discontinuous because it is substantially absorbed by the solid material), may very suitably be processed according to the invention.

The biomass is brought to the desired water to biomass ratio by adding water, and directly fed into the process. This allows for a more reliable operation.

The weight ratio of water to biomass varies from 50 to 0.5, preferably less than 20. A preferred range is from 15 to 2, more preferred from 10 to 2.5. Suitable sources of biomass come from biomass/water mixtures from aerobic or anaerobic fermentation of industrial or municipal waste with water to biomass ratios 4-5 which are used as such. Also agricultural waste products such as sugar beet pulp, grass, and municipal and household biowaste etc., having a water to biomass ratio ranging from 1 to 4 can be used, even without the addition of extra water. Chopped wood is used, for instance in a water to biomass ratio of 3. At this ratio, there is generally just sufficient water present to fill the interstitial space between the wood chips. In fact any type of biomass can be used, provided that in the case of particulate material, the particles have dimensions such that the feed remains pumpable. Suitable dimensions of the particles are in the range of 5-15 mm, preferably the (number) average size is 7-15 mm, more preferably 10-15 mm. The lower limit of the particle size is mainly dictated by the additional costs of size reduction and the upper limit by the dimensions of the subsequent transporting means such as pipe lines.

The water to increase the initial water to biomass ratio is preferably recycled water from the process itself. Preferably, the water to biomass ratio is from 20 to 1, preferably from 10 to 2, more preferably lower than 5.

The feed is brought to the desired pressure, which is in the range of 100 to 250 bar, preferably from 130 to 180 bar, in one step and preferably continuously from a pressure of 5 bar or less, more preferably from a pressure of 2 bar or less, even more preferably from atmospheric pressure, to the desired process pressure, preferably within a short period of time, generally in the order of minutes.

Such a process according to the invention has been found to be particularly reliable e.g. with respect to continuity of the process (reduced downtime of the installation) and/or offer an advantage with respect to energy consumption, compared to a two-step or multi step pressure increase.

The feed is brought to the desired pressure by one or more pumps in parallel having sufficient power. Examples of such pumps are those of the type that are used to plump concrete in construction works over relative large distances or altitudes such as membrane pumps or plunger pumps. It is also possible to increase the pressure autogenously.

Following pressurisation of the feed or concomitantly therewith, the mixture is brought to an increased temperature of at least 180° C., in general 200 to 275° C. preferable 225 to 250° C. but at most 280° C. The mixture is kept at this temperature for a period not more than 60 minutes, but at least 5 minutes, generally 10 to 50 minutes, but preferably 15 to 45 minutes, although 20-30 minutes are more preferred.

When biomass is used as a feed that does not or a lesser extent, necessitate the formation of a pulp previous to submitting the feed to the reaction step, it is an embodiment of the present invention that the pressurisation and the heating of the feed substantially serves to bring the feed to the desired pressure and temperature for the reaction step. This may apply, but is not limited to biomass that is at least partly available in a slurry form, for instance liquid biomass or biomass that contains only small particulate material, with a sufficient water to biomass ratio. The purpose of the heating step is then mainly to heat the feed prior to the reaction step.

The pulp which is obtainable from the process is separated to yield a liquid fraction and a solids containing fraction. The solids containing fraction, in a preferred embodiment, is directly used as a feed stream in a process for the generation of energy, optionally after further dewatering or other means of concentration such as by the use of hydrocyclones. The liquid fraction can be recycled to the front end of the process to adjust the water to biomass ratio. Depending on the type of biomass used, a part of the biomass dissolves during the process. A fraction containing the dissolved components may be separated. The liquid fraction containing. dissolved components is preferably subjected to further treatments such as fermentation or anaerobic digestion and the like. For instance, when the separated liquid fraction contains sugars and the like, such as cellulose or other carbohydrates, the production of high energetic fluids such as alcohol is envisaged.

It is preferred to perform the process at a pressure that exceeds the vapour pressure of the aqueous feed (biomass/water mixture) at the prevailing temperature.

Heating the feed is preferably accomplished by indirect heating and/or by reusing the heat that is provided by the process itself in an efficient manner. Mixing is provided for instance by a recycle pump, but also by the injection of gas, for instance optionally preheated $CO_2$-containing gas from the process itself.

In a further aspect of the invention, biomass is converted into a liquid hydrocarbon product. To this end the biomass is subjected to a first step in which a biomass containing aqueous feed is subjected to a treatment which comprises bringing the feed to a pressure of 100-250 bar, a second step in which the pressurised feed is kept at a temperature not exceeding 280° C. over a period of up to 60 minutes, thereby forming a reaction mixture and wherein the first step and the second step are carried out subsequently or concomitantly, and a reaction step in which the reaction mixture is heated over a period of up to 60 minutes to a temperature exceeding 280° C.

The first and the second step are similar to the process for the above-described production of pulp having an enhanced energy density. Following the first and second steps, a reaction step is carried out, using the pulp. Depending on the source of the biomass and the water to biomass ratio, the feed is immediately used in the reaction step of the process according to the invention. This reaction step can be carried out with the pulp, optionally dewatered, or with the solid fraction obtained from the pulp. During this step the reaction mixture that is formed as a result of the first and second step of the process is heated at a temperature exceeding the temperature in the second step. The temperature in the reaction step is preferably more than 280° C., more preferably exceeding 300° C., but most preferred more than 325° C., while the temperature preferably should not exceed 350° C. over a period of time up to 60 minutes, preferably ranging from 5 to 50 minutes, preferably 10 to 40 minutes. During this step the reaction mixture is converted to the liquid hydrocarbon product.

The duration of the heating appears important for obtaining an optimum conversion to liquid hydrocarbon product. A too long duration of the heating results in increased carbonisation of the feed and is thus undesirable as it lowers the yield of liquid hydrocarbon product. A too short duration of the heating may result in the reaction not taking place at a sufficient rate or with sufficient conversion. The duration of the heating ranges from up to 60 minutes, preferably up to 45 minutes, more preferably up to 30 minutes. A preferred range is in the order of 1-5 minutes. The conversion of the reaction mixture is optimal if the reaction mixture has a short residence time. The residence time is preferably from 5 to 30 minutes.

Heating of the reaction step is preferably accomplished by internal indirect heating, by means of optionally preheated $CO_2$-containing gas, the injection of steam or combinations thereof. The $CO_2$-containing gas can come from other steps in the process. To obtain optimum levels of conversion with minimal reaction volumes, the reaction and the heating are preferably carried out in a plug-flow type of operation.

The reaction mixture is advantageously heated in an efficient manner by providing an oxygen containing gas such as air to the reaction mixture. Under the reaction conditions employed, the oxygen reacts with the reaction mixture, thereby consuming the oxygen and part of the reaction mixture and producing thermal energy. The thermal energy is used to heat the reaction mixture.

The contents of stationary reactor in which the reaction is carried out consists preferably for the largest part of water and liquid hydrocarbon product, while the amount of unreacted reaction mixture is kept relatively low. In this manner an effective and efficient heat transfer takes place in such manner that the feed is rapidly brought to the desired temperature at which the conversion of the feed is carried out.

During the reaction step additional gases may be formed. However, the reaction step is preferably carried out as much as possible in a liquid-full operation, to minimize the high-pressure reactor volume. Accordingly the separation of the gases from the products of the second step and the reaction step is preferably accomplished in a separation step following the reaction step, optionally after reduction of the pressure and optionally of the temperature.

By employing these separation techniques the lighter fractions and water are separated from the heavier fractions. Subsequently, water is evaporated and, after condensation, obtained as a separate cleaner stream without minerals from the feed, thereby reducing the amount of waste water. In addition, the waste water contains less of the volatile dissolved organic compounds, the heat content of which is efficiently recovered by combustion in the process furnace. Before reducing the pressure to the final pressure for combustion in the process furnace, the pressure energy in the product gas is optionally recovered in special turbines for the production of electricity for use in the process.

The heavier fraction comprises the heavier oil components and remaining solid components. This fraction can be separated from the water phase or undergo additional treatment.

Important aspects of the present invention are the products that are obtainable through the process of the present invention. Separation of the product hydrocarbon in a lighter and a heavier fraction is advantageous as, optionally after further treatment or purification, the lighter fraction results in products that are suitable for direct application in methods of generating electrical and/or thermal energy. Subsequent further treatment of the lighter fraction, for instance by hydrogenation, allows for the use of the lighter fraction in for instance high-valuable transport fuels such as diesel and kerosene, that can be mixed with the conventional fossil fuels.

It is noteworthy that the further treatment of the lighter fraction, for instance by hydrogenation, is far less complicated than further treatment of the complete hydrocarbon stream as advocated in earlier publications.

The hydrocarbon product according to the present invention has in general an oxygen content of 10-15 wt. %, a lower heating value of 28-35 MJ/kg, a density in the range of 900-1100 $kg/M^3$ at 50° C., a molecular weight in the range of 60-800 with an average Mw of 250-350 and a boiling range of >90° C. of which ca. 50 wt. % boiling above 450° C. when corrected to atmospheric pressure. The mineral content is in general from 0.5 to 10 wt. % depending on the feed. The light fraction has an oxygen content of 5-25 wt. %, a lower heating value of 30-40 MJ/kg and a mineral content of less than 0.5 wt. %. The heavy fraction has an oxygen content of 10-20 wt. %, a lower heating value of 20-35 MJ/kg and a mineral content of 0.5 to 25 wt. %, depending on the feed.

The heavier fraction is preferably transformed to a stable and transportable fuel by a variety of possible methods, comprising for instance mixing with methanol and emulsification. Emulsification of the heavier fraction results in the formation of a bio-emulsion. A bio-emulsion according to the pre sent invention comprises an aqueous emulsion of solidified particles of the heavy fraction of the process. The emulsion contains from 55-95 wt. %, preferably from 65 to 70 wt. %, but at least more than 50 wt. % of the heavy fraction in water. This bio-emulsion is a high-calorific fuel that is easily transportable and is easily burned. Methods for the production of bio-emulsion are known in the art, for instance in the bitumen industry.

Another alternative for the heavy fraction is, after separation of the lighter fraction, to spray or flake the heavy fraction. The flaked heavy fraction solidifies, thereby forming small particles. This is a product that is solid at normal temperatures, does not flow or liquefy upon storage and is directly mixable with other solid fuels such as coal. The heavy fraction thus also provides for a fuel with an increased energy density.

Still another alternative for the heavy fraction is extraction with a suitable solvent, preferably polar, such as acetone, tetrahydrofuran or supercritical $CO_2$. In this way a substantial mineral free liquid hydrocarbon can be obtained in high yield, preferably above 70 wt. %, that can easily be transported and that is directly utilised with high efficiency for the production of electricity and/or heat. The product so obtained is also more easily transformed by hydrogenation, optionally in combination with the lighter fraction, to produce transport fuels as described earlier. The remainder of the heavy fraction after extraction contains all the minerals and can be used as a solid fuel in for instance cement kills or coal-burning power stations.

Extraction of the hydrocarbon product obtained from the reaction step with a suitable solvent provides for an alternative route to come to a product with an increased energy density. An extraction of the formed hydrocarbon product or biocrude may allow for the omission of a separation step in a light and heavy fraction. Whether this is an advantageous step is largely depending on the type of biomass and the constitution of the hydrocarbon containing product.

The waste water produced can be advantageously employed in other sections of the process, for instance to heat incoming feedstock and/or to adjust the water to biomass ratio. The final water effluent after separation from the hydrocarbon components can preferably and advantageously be further reduced in temperature and pressure by flashing; to remove most of the volatile dissolved organic components for use in the process furnace. The remaining water can be further treated, for instance biologically, to remove most of the residual hydrocarbon components and concentrated by for instance reverse osmosis. The concentrate can be used for instance for recycle as fertiliser for the production of biomass.

DESCRIPTION OF THE FIGURE

FIG. 1 discloses an embodiment of an installation for the conversion of biomass according to the present invention.

Feed G is brought into storage. From storage a suitable amount is entered into a pre-step VB wherein the feed is treated to be entered into the first step of the process. Step VB may include steps such as washing, comminuting etc. Water, preferably from a recycle stream can be added to adjust the water to biomass ratio to a desired level. Optionally the feed may be pre-heated, for instance to a temperature of 50-95° C. To this end heat produced elsewhere in the process can be used. Pump P serves to bring the pre-treated feed continuously to processing pressure, if necessary increased by 10 to 30 bar to overcome possible pipe resistance. In the preheater/pretreater VW the feed is converted into a pasty mass which can be transported through pipes, preferably without significant pressure loss. Heating of the feed, in this embodiment, can be achieved by mixing a recyclestream of process water with the feed stream. The recyclestream at this point is from 0.5 to 5 times the amount of the feedstream from P and serves to achieve a temperature of <280° C. for a period of up to 60 minutes. In the present example, this is achieved by keeping the resulting stream in VW for the desired period of time. The temperature in the recyclestream has been brought to 200-360° C. in heat exchanger E1. At this point the pulp can be obtained to be dewatered in order to obtain the solids containing fraction that can be used in the generation of energy and to obtain a liquid fraction containing the dissolved products A for further treatment.

The thus produced (softened mass is lead through heat exchanger E2 where the mass is further heated to the desired reaction temperature of >280° C. The volume of reactor R is selected such that the stream remains in reactor R for a sufficient period of time to substantially achieve the desired conversion. If desirable or considered advantageous, any of the functions VW, E2 and R may be combined into one apparatus. In this embodiment, the apparatus is then designed such that the stream goes through a number of zones subsequently. In these zones the different steps take place. The stream of liquid coming from R is cooled in heat exchanger E3 to temperatures between 180° C. and 300° C., to substantially avoid that the reaction proceeds too far and to collect heat of high temperature for use elsewhere in the process. Alternatively, when the conversion has not proceeded not yet far enough, an additional or continued reaction step can be carried out, for instance in a reactor such as a plug flow reactor. Separator S1 separates the oily from the aqueous phase. The oily phase is lead in flasher F1 to be separated in a light and a heavy biocrude fraction. The heavy fraction ZC can be further treated, for instance by pelletising or flaking, extraction or the like. In the present example the heavy fraction is obtained as such. The vapour coming from the flasher containing the light biocrude fraction is condensed in E4 and subsequently led to separator S2 to be separated.

The aqueous phase coming from S1 is split in a recyclestream which is led via pump P2 to heat exchanger E1. The remaining waterstream can be treated in a number of ways. In the present example, the pressure is lowered to 10-125 bar in flasher F2 and a vapour and liquid stream is formed at a temperature of 150-300° C. The liquid stream is, after cooling, together with other aqueous streams from elsewhere in the process, led to a water treatment facility WZ. In this facility the content of organic and inorganic residues is reduced to environmental acceptable levels, for instance by sedimentation, (an)aerobic digestion and the like. In the case of anaerobic digestion, which is preferred, the remaining organic residues are converted to biogas which can be used for the generation of energy, for instance to heat the process. The clean water stream can be discarded.

The vapour phase coming from the reactor R is lowered in pressure and cooled in heat exchanger E6 to condense water and biocrude. Vapour and liquid are separated in separator S3. The liquid stream from E4 and S3 are combined and led to separator S2-where oil and water are separated. A gaseous stream from S2 is led to the furnace that is used to generate heat for the process. The oil phase obtained in S2 is the light biocrude fraction LC.

The vapour- and gas streams that are obtained in the process can be led to the furnace. These streams comprise $CO_2$, water, flammable gases such as carbon monoxide, hydrogen, methane and other light organic compounds such as ethanol and acetic acid. The flammable gases are burned in the furnace with air and the heat thus generated is used to heat the process. This can be done in the form of heating a heat exchange medium or by the generation of steam. The heat exchange medium is used to provide heat to the heat exchanger E1 and E2. Extra heat is supplied to the heat exchange medium in heat exchanger E3. By careful tuning of the temperature levels of these heat exchangers maximum heat integration is achieved. If the heat generated by burning the flammable gases is insufficient, the furnace can additionally be supplied with extra fuel EB. As extra fuel biocrude is suitable. Alternatively the application of a fuel from an external source may be advantageous.

The exhaust gases from the furnace RG are cooled to an optimum temperature level and optionally pre-treated to remove for instance $NO_x$, and other undesirable ingredients before being vented into the atmosphere.

The composition of the liquid hydrocarbon product, and the fractions obtained therefrom, are given in the following table.

TABLE

| The liquid hydrocarbon product: | |
| --- | --- |
| Oxygen content | 10-15 wt. % |
| Lower heating value | 28-35 MJ/kg |
| Density | 900-1100 kg/m$^3$ at 50° C. |
| Molecular weight | 60-800 |
| Average Mw | 250-350 |
| boiling range | >90° C. |
| | ca. 50 wt. % boiling above 450° C. (corrected to atmospheric pressure |
| mineral content | 0.5-10 wt. % depending on the feed |
| Heavy fraction: | |
| Oxygen content | 10-20 wt. % |
| Lower heating value | 20-35 MJ/kg |
| mineral content | 0.5-25 wt. % depending on the feed |

TABLE-continued

The liquid hydrocarbon product:

Light fraction:

| | |
|---|---|
| Oxygen content | 5-25 wt. % |
| Lower heating value | 30-40 MJ/kg |
| mineral content | <0.5 wt. % |

EXAMPLE

Based upon laboratory experiments, the following simulated large-scale example was made. The mentioned references all related to FIG. 1.

Raw material stream G consists of 20.50 kg/sec of sugar beet residue (sugar beet pulp). This is a by-product of the manufacture of sugar from beets.

This raw material has the following composition:

| | |
|---|---|
| Organic material | 20.35 wt % |
| Minerals | 1.65 wt % |
| Water | 78.00 wt % |

In step VB the feeds stock stream is heated to 80° C. using heat recovered from downstream process streams. Without any additional water the feed is passed through two parallel plunger pumps P where the pressure is increased to 170 bar.

In the softener vessel VW the pressurised feedstock stream is combined with 19.15 kg/sec of a recycle water stream from heat exchanger E1, having a temperature of 350° C. and a pressure of 175 bar. The combined mixture in VW has a temperature of 230° C. The injection of the recycle water stream causes a substantial degree of mixing in vessel VW. The dimensions of the vessel are such that the mixture has an average residence time of 15 minutes. This residence time allows for a softening of the reaction mixture such that it will readily flow through heat exchanger E2 where it is heated to a temperature of 330° C. The heated reaction mixture (39.65 kg/sec) is then passed through reactor R where it is given an average residence time of 10 minutes at a pressure of 165 bar. It has been found from experiments that after the reaction time, three phases exist, notably a gaseous, an aqueous liquid and an organic liquid stream. The gaseous stream is separated from the liquid streams. In the present example the functions of E2, R, and the separation of the gaseous stream, are combined in one vessel with a special design.

The gaseous stream from R consists of 1.07 kg/sec of gases (0.96 kg/sec of carbon dioxide, 0,09 kg/sec of carbon monoxide and 0.02 kg/sec of hydrogen, methane and other gases), 1.28 kg/sec of water vapour, 0.05 kg/sec of biocrude vapour and 0.16 kg/sec of light organic compounds such as acetic acid and acetone. The stream is partially condensed in condenser E6 at 80° C., such that substantially all gases and light hydrocarbons remain in the vapour phase. These are separated from the condensate in separator S3 and routed to the process furnace. The condensate is passed to separator S2.

The combined liquid streams from R are cooled in exchanger E3 to 260° C. and subsequently separated in separator S1 into 1.85 kg/sec of biocrude and 35.24 kg/sec of liquid aqueous phase. The biocrude is flashed in flasher F1 where 0.43 kg/sec of vapour is generated. This is condensed in condenser E4 as light biocrude and routed to S2. Here the total light biocrude stream of 0.48 kg/sec.(LC) is isolated and sent to product storage. It may subsequently be upgraded by catalytic hydrogenation to produce 0.43 kg/sec of gasoil and kerosene, which are high-value constituents of transport fuel.

The liquid bottom stream from flasher F1 is 1.42 kg/sec of heavy biocrude product ZC. After cooling it is routed to product storage, and it can be further treated or used as such.

The 35.24 kg/sec liquid aqueous phase from separator S1 is split into 19.15 kg/sec recycle water stream to E1, and a stream of 16.09 kg/sec which is flashed in F2. The overhead vapour is partially condensed in E5. The remaining vapour contains 0.11 kg/sec of light organics and it is sent to the process furnace. The condensate is combined with the bottom stream of flasher F2. After suitable cooling this stream is combined with the aqueous stream from S2 and sent to the water treatment section WZ. Here the waste water is first cleaned up by anaerobic digestion, where from the 0.12 kg/sec of light organics contained in it biogas is formed in such quantity that it contains 80% of the heating value of the organics. The remaining water is further treated by suitable methods and the clean water stream WA is discarded.

The process furnace serves to provide heat to a heat transfer medium which provides heat to exchangers E1 and E2. The combined process streams to the furnace provide 14.1 MW (lower heating value) of combustion heat. Additional 1.3 MW is required from external fuel EB. With the above data it can be calculated that the process shown in this example has a thermal efficiency of 74.9%. The thermal efficiency is defined as the ratio of the lower heating values of the combined biocrude product streams at one hand, and that of the feedstock plus that of the external fuel at the other hand.

The invention claimed is:

1. Process for continuously producing a hydrocarbon product having an enhanced energy density from biomass, comprising
    a first step in which a biomass-containing aqueous feed that is not pre-heated or is pre-heated in the range of 50-95° C. is subjected to a treatment which comprises bringing the feed in a single step from a pressure of 5 bar or less to a pressure of 100-250 bar,
    a second step subsequent to the first step in which the temperature of the pressurized feed is increased from 95° C. or less to above 180° C. and the pressurized feed is kept at a temperature not exceeding 280° C. over a period of up to 60 minutes, thereby forming a reaction mixture,
    a reaction step in which the reaction mixture is heated over a period of up to 60 minutes to a temperature exceeding 280° C.

2. Process according to claim 1, further comprising a separation and isolation phase comprising separating and/or isolating the resulting gas and hydrocarbon containing fractions.

3. Process according to claim 1, wherein after the reaction step the reaction mixture is cooled by flashing the mixture containing the product.

4. Process according to claim 1, wherein the hydrocarbon containing fraction is separated in a lighter fraction and a heavier fraction.

5. Process according to claim 1, wherein the aqueous biomass feed has a water to biomass ratio of at least 3.

6. Process according to claim 1, wherein during the second step a pulp or a reaction mixture is formed in which the macromolecular structures in the feed are degraded and/or depolymerised.

7. Process according to claim 1, whereby the heating of the feed in the reaction step is accomplished by the introduction of an oxygen containing gas.

8. Process according to claim 1, wherein the heavier fraction is subjected to a further reaction.

9. Process according to claim 1, wherein during the reaction step the reaction mixture is substantially converted to a hydrocarbon containing product.

10. Process according to claim 8, wherein the heavier fraction is further converted in a plug-f low reactor.

11. Process according to claim 1, wherein prior to heating the reaction mixture at least part of the aqueous liquid containing fermentable components is separated.

12. Process according to claim 1, wherein the average particle size of the solids in the biomass is 5-15 mm, preferably 10-15 mm.

13. Process according to claim 1, wherein the aqueous phase in the biomass containing aqueous feed is the discontinuous phase.

14. Process according to claim 1, wherein the pulp is separated in a liquid fraction and a solids-containing fraction.

15. Process according to claim 14, wherein the liquid fraction is further treated by fermentation or anaerobic digestion or a combination thereof.

16. Process according to claim 14, wherein the solids containing fraction is used in a process for the generation of energy.

17. Process according to claim 1, further comprising an extraction step after the reaction step.

18. Process according to claim 2, wherein:
   after the reaction step the reaction mixture is cooled by flashing the mixture containing the product;
   the hydrocarbon containing fraction is separated in a lighter fraction and a heavier fraction;
   the aqueous biomass feed has a water to biomass ratio of at least 3;
   during the second step a pulp or a reaction mixture is formed in which the macromolecular structures in the feed are degraded and/or depolymerised;
   whereby the heating of the feed in the reaction step is accomplished by the introduction of an oxygen containing gas;
   the heavier fraction is subjected to a further reaction;
   during the reaction step the reaction mixture is substantially converted to a hydrocarbon containing product or the heavier fraction is further convered in a plug-flow reactor;
   prior to heating the reaction mixture at least part of the aqueous liquid containing fermentable components is separated;
   the average particle size of the solids in the biomass is 5-15 mm, preferably 10-15 mm;
   the aqueous phase in the biomass containing aqueous feed is the discontinuous phase;
   in said first step the biomass containing aqueous feed is subjected to a treatment which comprises bringing the feed in a single step from a pressure of 5 bar or less to a pressure of 100-250 bar; and
   the pulp is separated in a liquid fraction and a solids-containing fraction.

19. Process according to claim 18, wherein the liquid fraction is further treated by fermentation or anaerobic digestion or a combination thereof.

20. Process according to claim 19, wherein the solids containing fraction is used in a process for the generation of energy.

21. Process according to claim 18, further comprising an extraction step after the reaction step.

22. process according to claim 19, further comprising an extraction step after the reaction step.

23. Process according to claim 20, further comprising an extraction step after the reaction step.

* * * * *

UNITED STATES PATENT AND TRADEMARK OFFICE
CERTIFICATE OF CORRECTION

PATENT NO.        : 7,262,331 B2
APPLICATION NO.   : 10/363337
DATED             : August 28, 2007
INVENTOR(S)       : Lambertus van de Beld et al.

It is certified that error appears in the above-identified patent and that said Letters Patent is hereby corrected as shown below:

Title Page, (86), "August 13, 2003" should read --June 2, 2003--;

Column 3, line 51, "plump" should read --pump--;

Column 6, line 27, "pre sent" should read --present--;

Column 9, line 28, "the feeds stock stream" should read --the feedstock stream--;

Column 11, claim 16, line 30, "according to claim 14," should read --according to claim 15,-- and Column 12, claim 22, line 33, "process" should read --Process--.

Signed and Sealed this

Twenty-fifth Day of November, 2008

JON W. DUDAS
*Director of the United States Patent and Trademark Office*